United States Patent
Yamamoto et al.

(10) Patent No.: US 6,687,143 B2
(45) Date of Patent: Feb. 3, 2004

(54) RECTIFYING CIRCUIT AND SWITCHING POWER SUPPLY DEVICE HAVING THE SAME

(75) Inventors: Junichi Yamamoto, Tokyo (JP); Masakazu Takagi, Tokyo (JP); Masahiro Gamou, Tokyo (JP); Katsuhiko Shimizu, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/219,742

(22) Filed: Aug. 16, 2002

(65) Prior Publication Data

US 2003/0039133 A1 Feb. 27, 2003

(30) Foreign Application Priority Data

Aug. 23, 2001 (JP) .......................................... 2001-253042

(51) Int. Cl.⁷ ................................................ H02M 7/06
(52) U.S. Cl. ....................................... 363/126; 363/147
(58) Field of Search ................................... 363/126, 147

(56) References Cited

U.S. PATENT DOCUMENTS

| | | | | |
|---|---|---|---|---|
| 4,897,763 A | * | 1/1990 | Denzler | ....................... 361/699 |
| 5,130,918 A | | 7/1992 | Schuster | ....................... 363/141 |
| 6,144,571 A | * | 11/2000 | Sasaki et al. | ................ 363/144 |
| 6,278,264 B1 | | 8/2001 | Burstein et al. | ............. 323/282 |
| 6,339,320 B1 | * | 1/2002 | Spremo et al. | ............. 323/355 |
| 6,381,161 B2 | * | 4/2002 | Mourick | ...................... 363/147 |
| 6,490,187 B2 | * | 12/2002 | Mori et al. | .................. 363/147 |

* cited by examiner

Primary Examiner—Bao Q. Vu
(74) Attorney, Agent, or Firm—Oblon, Spivak, McClelland, Maier & Neustadt, P.C.

(57) ABSTRACT

A rectifying circuit having a pair of input terminals at which voltage having an AC waveform appears, a plurality of first rectifying elements 41, a plurality of second rectifying elements 42, a first wiring pattern 71 for connecting one of the paired input terminals to the plurality of first rectifying elements 41, and a second wiring pattern 72 for connecting the other of the paired input terminals to the plurality of second rectifying elements 42. In the rectifying circuit, the plurality of first rectifying elements 41 and the plurality of second rectifying elements 42 are laid out so that at least two boundaries between the first and second rectifying elements adjacent to each other are present. With such a layout of the rectifying elements, current flow paths between one of the input terminals and the plurality of first rectifying elements 41 and current flow paths between the other of the input terminals and the plurality of second rectifying elements 42, are closely disposed. Therefore, AC resistance Rac in the first wiring pattern 71 and the second wiring pattern 72 is effectively reduced.

23 Claims, 9 Drawing Sheets

RECTIFYING CIRCUIT AND SWITCHING POWER SUPPLY DEVICE HAVING THE SAME

BACKGROUND OF THE INVENTION

The present invention relates to a rectifying circuit. More particularly, the invention relates to a rectifying circuit having wiring patterns configured to have reduced resistance Rac. The invention also relates to a switching power supply device, and more particularly to a switching power supply device including a rectifying circuit having wiring patterns configured to have reduced resistance Rac.

Generally, the switching power supply device includes a switching circuit for converting DC input voltage into AC voltage, a rectifying circuit for rectifying the AC voltage converted, and a smoothing circuit which smoothes the output voltage from the rectifying circuit and generates a DC output voltage. The switching power supply device thus arranged is capable of generating an output voltage whose value is different from an input voltage. The rectifying circuit of the switching power supply device includes a pair of input terminals, a pair of output terminals and a plurality of rectifying elements. In the rectifying circuit, an AC voltage to be rectified is applied to the pair of input terminals, and an output voltage having a rectified waveform appears between the pair of output terminals.

FIG. 11 is a plan view schematically showing a circuit layout of a conventional rectifying circuit.

As shown in FIG. 11, the conventional rectifying circuit includes three first rectifying elements 1-1, 1-2 and 1-3 and three second rectifying elements 2-1, 2-2 and 2-3, and those rectifying elements are linearly arranged in this order. The first rectifying elements 1-1, 1-2 and 1-3 are connected in parallel between a first secondary side terminal 4 of a transformer 3 and a grand terminal 7. The second rectifying elements 2-1, 2-2 and 2-3 are connected in parallel between a second secondary side terminal 5 of the transformer 3 and the grand terminal 7. With this arrangement, the first and the second secondary side terminals 4 and 5 serve as a pair of input terminals of the rectifying circuit. A center tap 6 of the transformer 3 and the grand terminal 7 serve as a pair of output terminals of the rectifying circuit. In this arrangement, the first rectifying elements 1-1, 1-2 and 1-3 are connected in parallel and the second rectifying elements 2-1, 2-2 and 2-3 are connected in parallel. It is for this reason that the increase of the current drive capability of the rectifying circuit is intended.

A wiring pattern 10 is used for connecting the first rectifying elements 1-1, 1-2 and 1-3 to the first secondary side terminal 4 of the transformer 3. A wiring pattern 11 is used for connecting the second rectifying elements 2-1, 2-2 and 2-3 to the second secondary side terminal 5 of the transformer 3. A wiring pattern 12 is used for connecting the rectifying elements to the grand terminal 7. Those wiring patterns 10 to 12 are all formed on a surface of a printed circuit board.

The DC resistance Rdc between each of the rectifying elements and the related terminals connected thereto (the first and the second secondary side terminals 4 and 5, and the grand terminal 7) is given by $$Rdc = Ro \times L / S$$

where

Ro: resistivity of each of wiring patterns 10 to 12

L: length of each of wiring patterns 10 to 12

S: cross sectional area of each of wiring patterns 10 to 12.

However, the conventional rectifying circuit thus arranged suffers from following problem. In the circuit, as a frequency of a current flowing through the rectifying circuit becomes high, an AC resistance Rac between the rectifying elements and the terminals connected there to becomes large. For example, in the circuit layout shown in FIG. 11, when a frequency of an AC voltage to be rectified is about 200 kHz, the AC resistance Rac is considerably large, e.g., three to four times as large as the DC resistance Rdc in value. As a result, such a problem arises that large loss is generated in the rectifying circuit, particularly in a high-frequency region.

SUMMARY OF THE INVENTION

Accordingly, an object of the invention is to provide a rectifying circuit having wiring patterns configured to have reduced resistance Rac.

Another object of the invention is to provide a rectifying circuit in which the rectifying elements are optimumly arranged.

Yet another object of the invention is to provide a switching power supply device having a rectifying circuit having wiring patterns configured to have reduced resistance Rac.

Still another object of the invention is to provide a switching power supply device having a rectifying circuit in which the rectifying elements are optimumly arranged.

According to one aspect of the present invention, there is provided a rectifying circuit having a pair of input terminals at which an AC voltage appears, a plurality of first rectifying elements, a plurality of second rectifying elements, a first wiring pattern for connecting one of the paired input terminals to the plurality of first rectifying elements, and a second wiring pattern for connecting the other of the paired input terminals to the plurality of second rectifying elements, wherein the plurality of first rectifying elements and the plurality of second rectifying elements are laid out so that at least two boundaries between the first and second rectifying elements adjacent to each other are present.

In the invention, the plurality of first rectifying elements and the plurality of second rectifying elements are laid out so that at least two boundaries between the first and second rectifying elements adjacent to each other are present. With such a layout of the rectifying elements, current flow paths between one of the input terminals and the plurality of first rectifying elements and current flow paths between the other of the input terminals and the plurality of second rectifying elements, are closely disposed. Therefore, AC resistance Rac in the first wiring pattern and the second wiring pattern is effectively reduced.

Preferably, the number of boundaries between the first and second rectifying elements adjacent to each other, is larger than the sum of the number of boundaries between the two first rectifying elements adjacent to each other, and the number of boundaries between the two second rectifying elements adjacent to each other.

In the preferred circuit mentioned above, AC resistance Rac in the first wiring pattern and the second wiring pattern is more effectively reduced.

Preferably, in the rectifying circuit, the plurality of first rectifying elements and the plurality of second rectifying elements are alternately arranged.

In another preferred circuit mentioned above, AC resistance Rac in the first wiring pattern and the second wiring pattern is more effectively reduced.

Preferably, in the rectifying circuit, the plurality of first rectifying elements and the plurality of second rectifying elements are substantially linearly arranged.

Still preferably, in the rectifying circuit, the plurality of first rectifying elements and the plurality of second rectifying elements are arcuately arranged.

In still another preferred circuit as mentioned above, the DC resistance Rdc per se in the first wiring pattern and the second wiring pattern is reduced, and hence the AC resistance Rac thereof is further reduced.

Preferably, the rectifying circuit further includes a pair of output terminals at which a voltage produced by rectifying the AC voltage, and a third wiring pattern for connecting one of the output terminals to the plurality of first rectifying elements and the plurality of second rectifying elements.

According to the preferred circuit as mentioned above, a current flow path between one of the output terminals and the plurality of first rectifying elements and a current flow path between one of the output terminals and the plurality of second rectifying elements, may be closely disposed. Therefore, the AC resistance Rac in the third wiring pattern is effectively reduced.

Preferably, in the rectifying circuit, the first wiring pattern is formed with of a plurality of first unit wiring patterns formed on a multi-layered circuit board, and the second wiring pattern is formed with a plurality of second unit wiring patterns formed on the multi-layered circuit board.

Preferably, in the rectifying circuit, the plurality of first unit wiring patterns and the plurality of second unit wiring patterns are alternately formed in the multi-layer circuit board.

According to the preferred embodiments as mentioned above, a current flow path between one of input terminals and the plurality of first rectifying elements and a current flow path between the other of input terminals and the plurality of second rectifying elements, are closely disposed in the horizontal and the vertical directions. Therefore, the AC resistance Rac in the first wiring pattern and the second wiring pattern is more effectively reduced.

According to another aspect of the present invention, there is provided a switching power supply device having a switching circuit for converting DC input voltage into AC voltage, a rectifying circuit for rectifying the AC voltage, and a smoothing circuit for smoothing output voltage from the rectifying circuit, the improvement being characterized in that the rectifying circuit includes a pair of input terminals to which the AC voltage is applied, a plurality of first rectifying elements, a plurality of second rectifying elements, a first wiring pattern for connecting one of the paired input terminals to the plurality of first rectifying elements, and a second wiring pattern for connecting the other of the paired input terminals to the plurality of second rectifying elements, wherein the plurality of first rectifying elements and the plurality of second rectifying elements are laid out so that at least two boundaries between the first and second rectifying elements adjacent to each other are present.

According to the invention, a current flow path between one of the input terminals and the plurality of first rectifying elements and a current flow path between the other of the input terminals and the plurality of second rectifying elements, may be closely disposed. Therefore, AC resistance Rac in the first wiring pattern and the second wiring pattern is effectively reduced. With this feature, in a case where the output current is large, or in a case where the switching frequency is high, the loss generated in the rectifying circuit is effectively suppressed.

Preferably, in the switching power supply device, the number of boundaries between the first and second rectifying elements adjacent to each other, is larger than the sum of the number of boundaries between the two first rectifying elements adjacent to each other, and the number of boundaries between the two second rectifying elements adjacent to each other.

Preferably, in the switching power supply device, the plurality of first rectifying elements and the plurality of second rectifying elements are alternately arranged.

Preferably, the rectifying circuit further includes a pair of output terminals connected to the smoothing circuit, and a third wiring pattern for connecting one of the paired output terminals to the plurality of first rectifying elements and the plurality of second rectifying elements.

Still preferably, the switching power supply device further includes a transformer having a pair of secondary side terminals and a center tap, wherein the paired input terminals of the rectifying circuit are connected to the paired secondary side terminals of the transformer, and the other of the paired output terminals of the rectifying circuit is connected to the center tap of the transformer.

DETAILED DESCRIPTION OF THE PREFERRED EMBODIMENTS

The preferred embodiments of the present invention will be described in detail with reference to the accompanying drawings.

Figure 1:
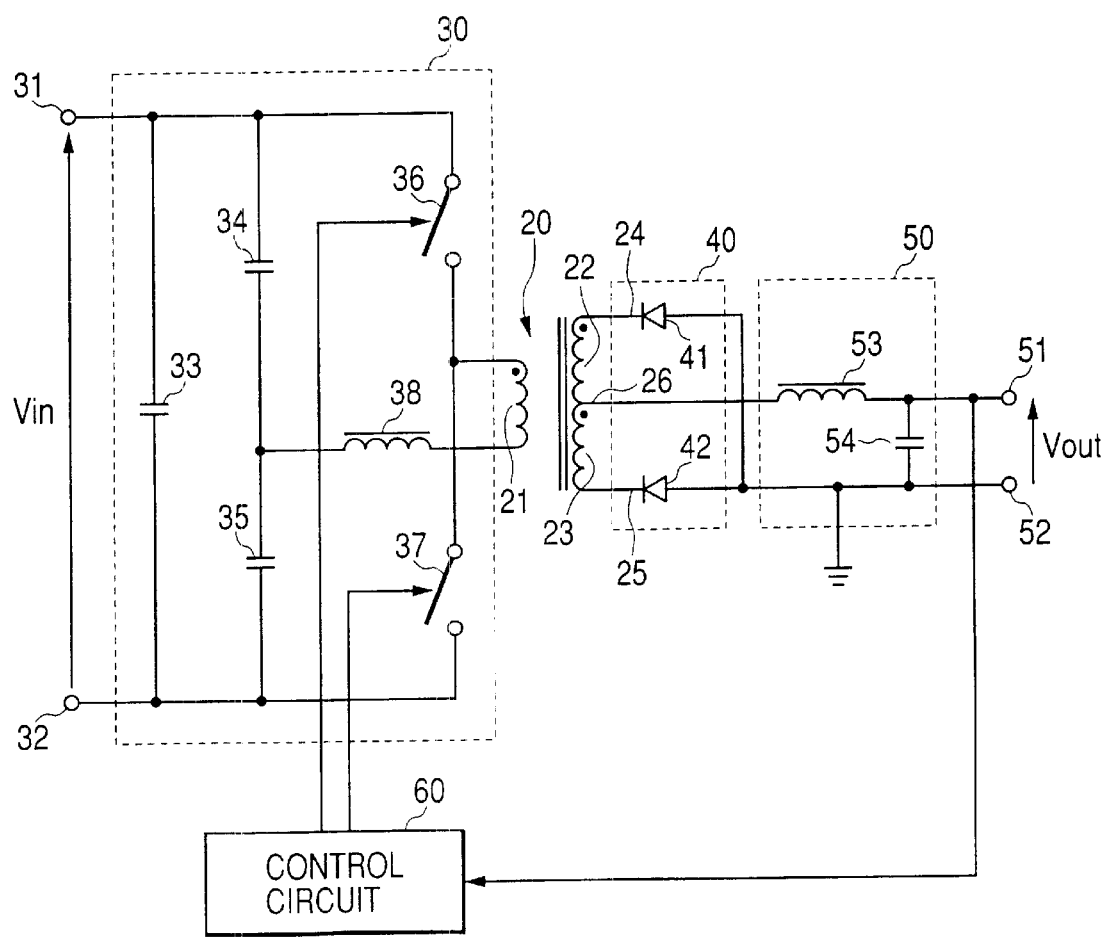
FIG. 1 is a circuit diagram showing a switching power supply device, which is a preferred embodiment of the invention.

FIG. 1 is a circuit diagram showing a switching power supply device, which is a preferred embodiment of the invention.

As shown in FIG. 1, the switching power supply device of the embodiment includes a transformer 20, a half bridge type switching circuit 30 provided on the primary side of the transformer 20, a rectifying circuit 40 provided on the secondary side of the transformer 20, a smoothing circuit 50 provided at a post stage of the rectifying circuit 40 and a control circuit 60 for controlling the switching circuit 30.

The transformer 20 is a center-tap transformer which includes a primary winding 21 and secondary windings 22 and 23. As will be described later, the transformer 20 includes a first terminal 24 derived from one end of the secondary winding 22, a second terminal 25 derived from one end of the secondary winding 23, and a center tap 26 (a node between the other end of the secondary winding 22 and the other end of the secondary winding 23).

The switching circuit 30 includes a first input capacitor 33 connected between a pair of input terminals 31 and 32 to which DC input voltage Vin is applied, a second input capacitor 34 and a third input capacitor 35 which are connected in series between the input terminals 31 and 32, and a first main switch 36 and a second main switch 37 which are connected in series between the input terminals 31 and 32. The primary winding 21 of the transformer 20 is provided between the node between the second and the third input capacitors and the node between the first and the second main switches. Leakage inductance 38 is present between the primary winding 21 of the transformer 20 and the node between the second and the third input capacitors.

The rectifying circuit 40 includes a first rectifying element group 41 and a second rectifying element group 42. As will be described hereunder, the first and the second rectifying element groups 41 and 42 are each made up of a plurality of rectifying diodes connected in parallel. The cathode sides of the first rectifying element group 41 are connected to the first terminal 24 as one end of the primary winding 21 of the transformer 20. The cathode sides of the second rectifying element group 42 are connected to the second terminal 25 as one end of the secondary winding 22 of the transformer 20. The anode sides of the first and the second rectifying element groups 41 and 42 are connected in common. With this arrangement, the cathode side of the first rectifying element group 41 and the cathode side of the second rectifying element group 42 serve as a pair of input terminals of the rectifying circuit 40. The center tap 26 of the transformer 20 and the common anode connection point serve as a pair of output terminals of the rectifying circuit 40. As shown in FIG. 1, the common anode connection point is connected to ground.

The smoothing circuit 50 includes a smoothing inductor 53 and a smoothing capacitor 54. The smoothing inductor 53 is connected at one end to one output terminal 51 and at the other end to the center tap which is one of the output terminals of the rectifying circuit 40. The smoothing capacitor is connected between the paired output terminals 51 and 52. As shown in FIG. 1, the other output terminal 52 is connected to ground. A load to be driven is connected across the paired output terminals 51 and 52.

The control circuit 60 monitors an output voltage Vout which appears between the paired output terminals 51 and 52, and controls the duty cycles of the first main switch 36 and the second main switch 37, which are contained in the switching circuit 30 so that the output voltage has a predetermined voltage value.

Figure 2:
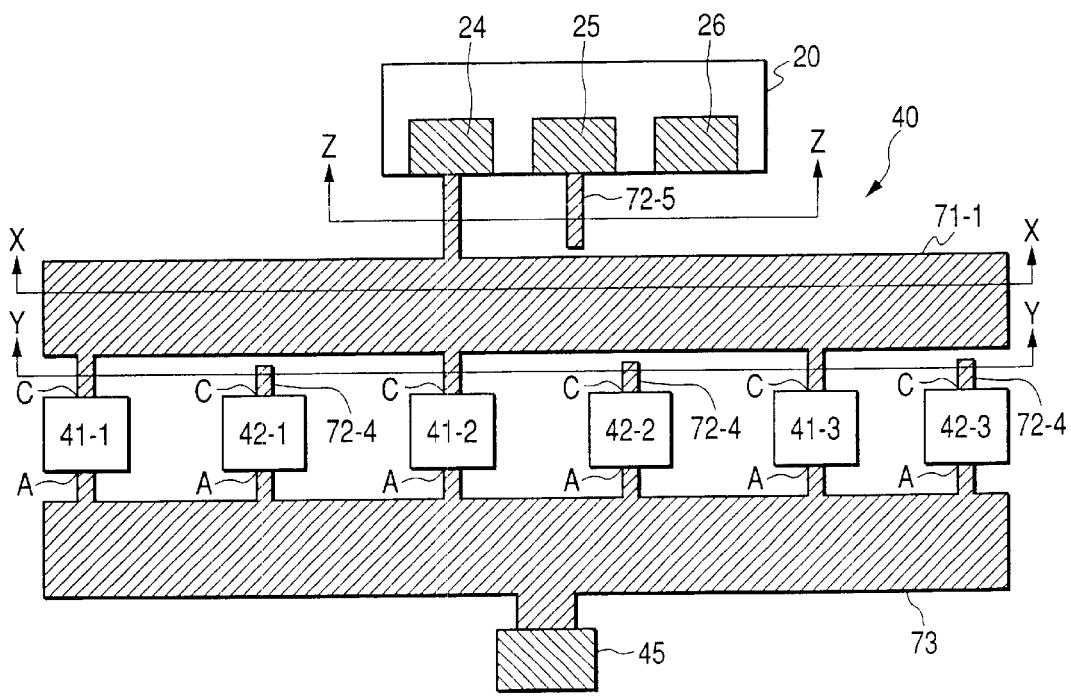
FIG. 2 is a plan view schematically showing a circuit layout of a rectifying circuit 40, which is a preferred embodiment of the invention.

FIG. 2 is a plan view schematically showing a circuit layout of the rectifying circuit 40.

As shown in FIG. 2, the rectifying circuit 40 includes three first rectifying elements 41-1, 41-2 and 41-3 and three second rectifying elements 42-1, 42-2 and 42-3. Those first rectifying elements 41-1, 41-2 and 41-3 constitute the first rectifying element group 41, and the second rectifying elements 42-1, 42-2 and 42-3 constitute the second rectifying element group 42. Those rectifying elements, the first rectifying element 41-1, the second rectifying element 42-1, the first rectifying element 41-2, the second rectifying element 42-2, the first rectifying element 41-3 and the second rectifying element 42-3 are linearly arranged in this order, as shown in FIG. 2. The transformer 20 is disposed on one side of the rectifying elements thus linearly arranged, and a grand terminal 45 is disposed on the other side of the rectifying elements.

The cathodes "C" of the first rectifying elements 41-1, 41-2 and 41-3 are connected to the first terminal 24 of the transformer 20. The cathodes "C" of the second rectifying elements 42-1, 42-2 and 42-3 are connected to the second terminal 25 of the transformer 20. In the embodiment, the cathodes of the first rectifying elements 41-1, 41-2 and 41-3 are connected to the first terminal 24 of the transformer 20, by a wiring pattern 71. The cathodes of the second rectifying elements 42-1, 42-2 and 42-3 are connected to the second terminal 25 of the transformer 20, by a wiring pattern 72. The anodes "A" of the rectifying elements are connected to the grand terminal 45, by a wiring pattern 73.

Figure 3:
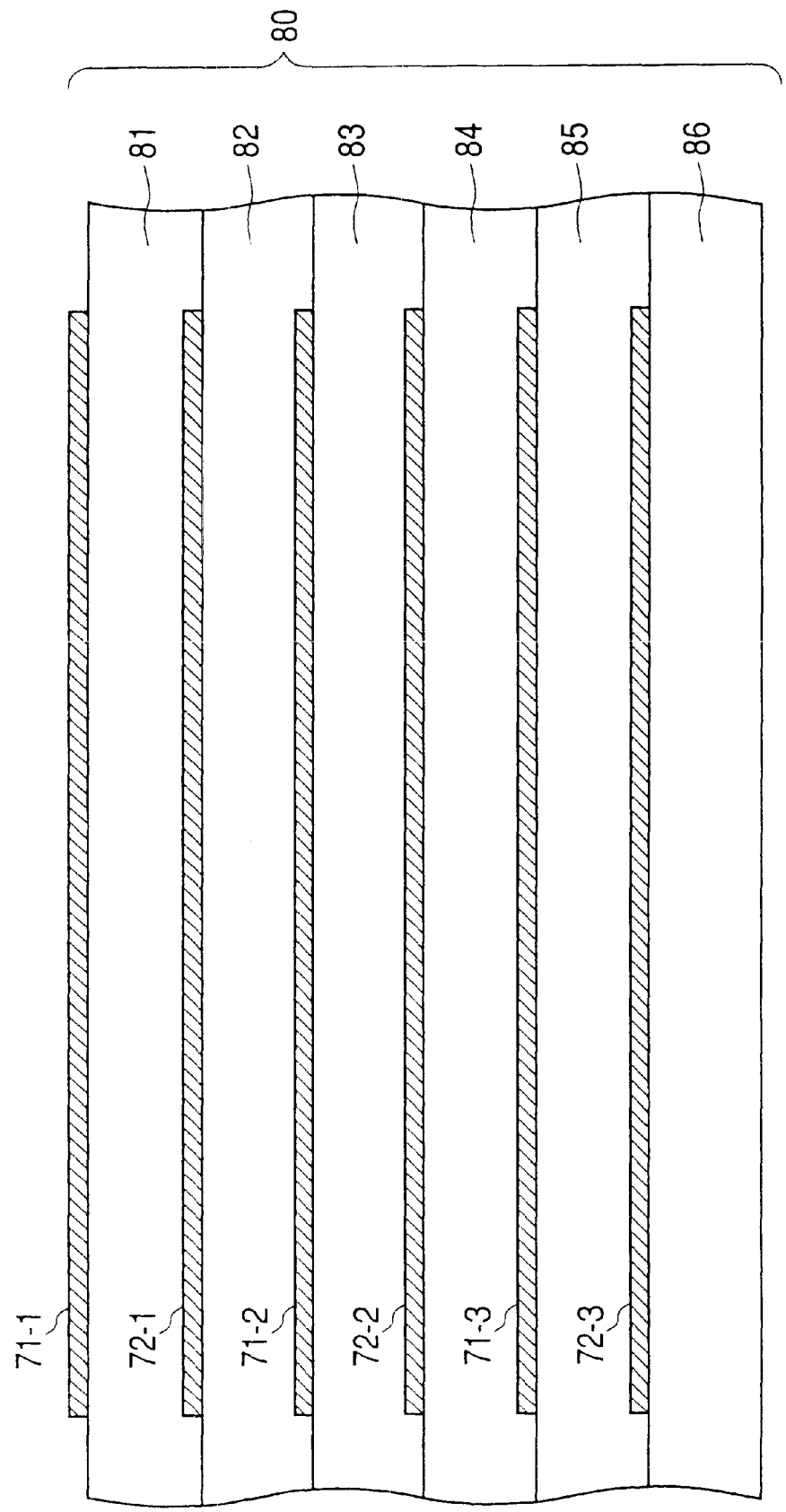
FIG. 3 is a sectional view taken on line X—X in FIG. 2.

FIG. 3 is a sectional view taken on line X—X in FIG. 2.

As shown in FIG. 3, a printed circuit board 80 on which the rectifying circuit 40 of the embodiment is formed is a multi-layered circuit board consisting of six layers of substrates 81 to 86. Unit wiring patterns 71-1, 71-2 and 71-3 which constitute the wiring pattern 71 and unit wiring patterns 72-1, 72-2 and 72-3 which constitute the wiring pattern 72 are alternately arranged one upon the other, as shown.

To be more specific, the unit wiring pattern 71-1 is formed on the surface of the substrate 81 which is the uppermost layer (mounting surface of the rectifying elements) of the multi-layered circuit board. The unit wiring pattern 72-1 is formed on the surface of the substrate 82 under the substrate. The unit wiring pattern 71-2 is formed on the surface of the substrate 83 under the substrate. The unit wiring pattern 72-2 is formed on the surface of the substrate 84 under the substrate. The unit wiring pattern 71-3 is formed on the surface of the substrate 85 under the substrate. The unit wiring pattern 72-3 is formed on the surface of the substrate 86 (the lowermost layer) under the substrate. Further, as shown in FIG. 2, unit wiring patterns 72-4 and 72-5 are each formed on the surface of the uppermost substrate 81. Those unit wiring patterns 72-4 and 72-5 belong to the wiring pattern 72.

Figure 4:
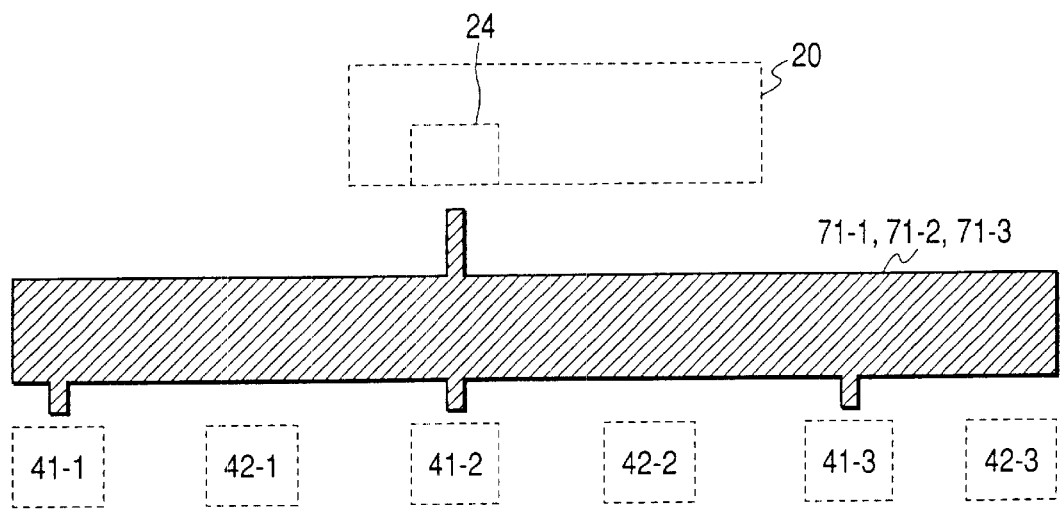
FIG. 4 is a plan view schematically showing unit wiring patterns 71-1, 71-2 and 71-3.

FIG. 4 is a plan view schematically showing the unit wiring patterns 71-1, 71-2 and 71-3.

As shown in FIG. 4, the unit wiring patterns 71-1, 71-2 and 71-3 are substantially the same in planar shape, and those unit wiring patterns have each parts protruded toward the parts on which the first rectifying elements 41-1, 41-2 and 41-3 are disposed, and a part protruded toward the first terminal 24 of the transformer 20.

Figure 5:
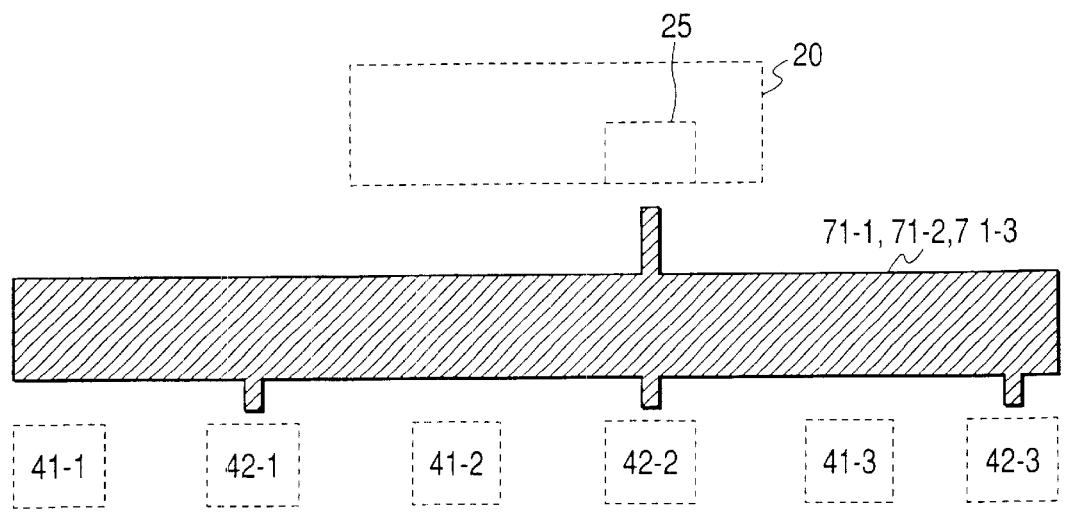
FIG. 5 is a plan view schematically showing unit wiring patterns 72-1, 72-2 and 72-3.

FIG. 5 is a plan view schematically showing the unit wiring patterns 72-1, 72-2 and 72-3.

As shown in FIG. 5, the unit wiring patterns 72-1, 72-2 and 72-3 are substantially the same in plan shape, and those unit wiring patterns have each parts protruded toward parts on which the second rectifying elements 42-1, 42-2 and 42-3 are disposed, and a part protruded toward the second terminal 25 of the transformer 20.

Figure 6:
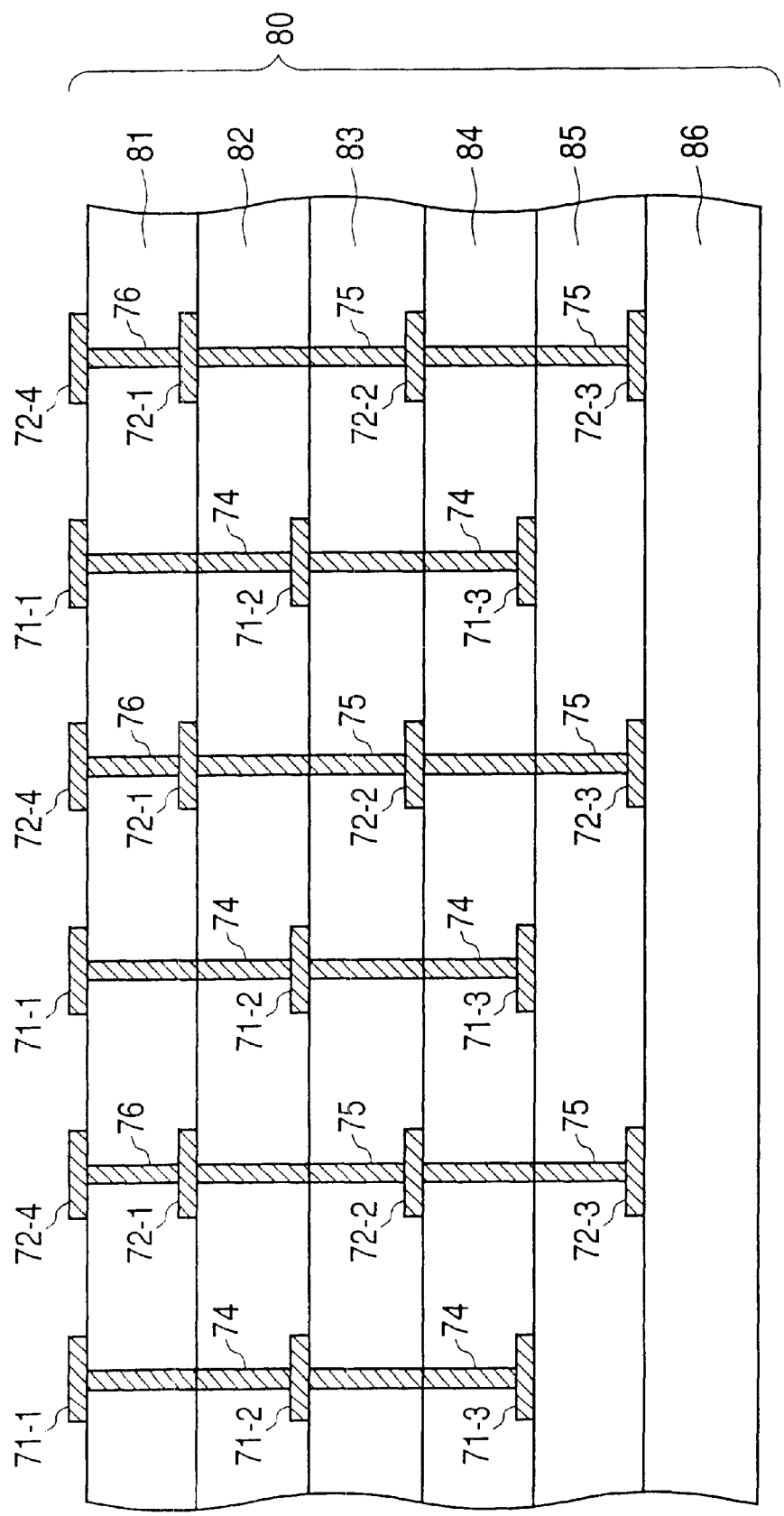
FIG. 6 is a sectional view taken on line Y—Y in FIG. 2.

FIG. 6 is a sectional view taken on line Y—Y in FIG. 2.

As shown in FIG. 6, the parts of the unit wiring patterns 71-1, 71-2 and 71-3 protruded toward the first rectifying elements 41-1, 41-2 and 41-3 are connected together by through-hole wirings 74 formed in the substrates 81 to 84.

Similarly, the parts of the unit wiring patterns 72-1, 72-2 and 72-3 protruded toward the second rectifying elements 42-1, 42-2 and 42-3 are connected together by through-hole wirings 75 formed in the substrates 82 to 85. The parts of the unit wiring pattern 72-1 protruded toward the first rectifying elements 41-1, 41-2 and 41-3 are connected to the unit wiring pattern 72-4 by a through-hole wiring 76 formed in the substrate 81. The parts of the unit wiring pattern 71-1 protruded toward the first rectifying elements 41-1, 41-2 and 41-3 are respectively connected to the cathodes "C" of the first rectifying elements 41-1, 41-2 and 41-3 by soldering (not shown). The unit wiring patterns 72-4 are connected to the cathodes "C" of the second rectifying elements 42-1, 42-2 and 42-3 by soldering (not shown).

Figure 7:
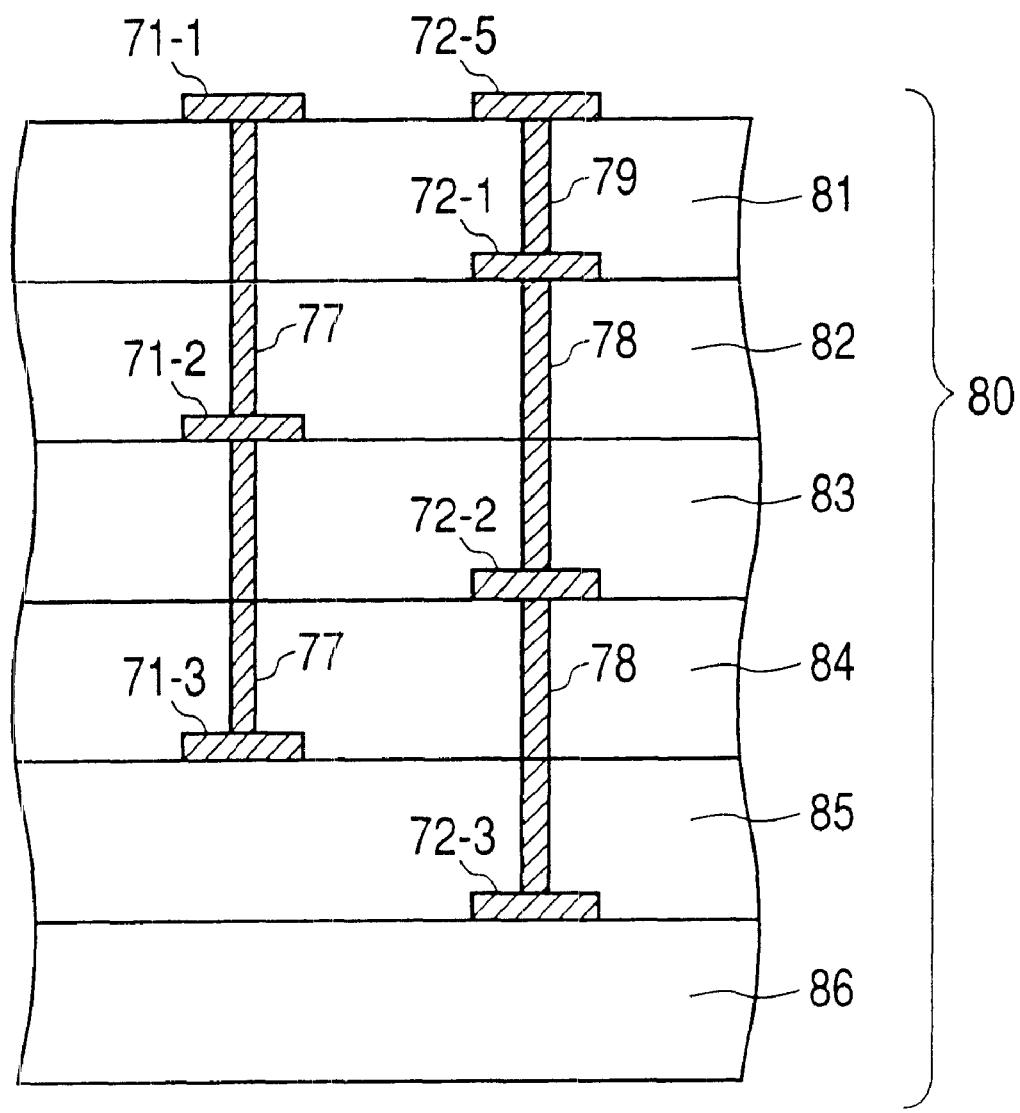
FIG. 7 is a sectional view taken on line Z—Z in FIG. 2.

FIG. 7 is a sectional view taken on line Z—Z in FIG. 2.

As shown in FIG. 7, the parts of the unit wiring patterns 71-1, 71-2 and 71-3 protruded toward the transformer 20 are connected together by through-hole wirings 77 formed in the substrates 81 to 84. Similarly, the parts of the unit wiring patterns 72-1, 72-2 and 72-3 protruded toward the transformer 20 are connected together by a through-hole wiring 78 formed in the substrates 82 to 85. The part of the unit wiring pattern 72-1 protruded toward the transformer 20 is connected to the unit wiring pattern 72-5 by a through-hole wiring 79 formed in the substrate 81. The part of the unit wiring pattern 71-1 protruded toward the transformer 20 is connected to the first terminal 24 of the transformer 20 by soldering (not shown). The unit wiring pattern 72-5 is connected to the second terminal 25 of the transformer 20 by soldering (not shown).

In the rectifying circuit 40 thus constructed, a phase of a current which flows between the cathodes "C" of the first rectifying elements 41-1, 41-2 and 41-3 and the first terminal 24 of the transformer 20 is out of that of a current which flows between the cathodes "C" of the second rectifying elements 42-1, 42-2 and 42-3 and the second terminal 25 of the transformer 20. Similarly, a phase of a current which flows between the anodes "A" of the first rectifying elements 41-1, 41-2 and 41-3 and the grand terminal 45 is out of that of a current which flows between the anodes "A" of the second rectifying elements 42-1, 42-2 and 42-3 and the grand terminal 45.

Figure 8:
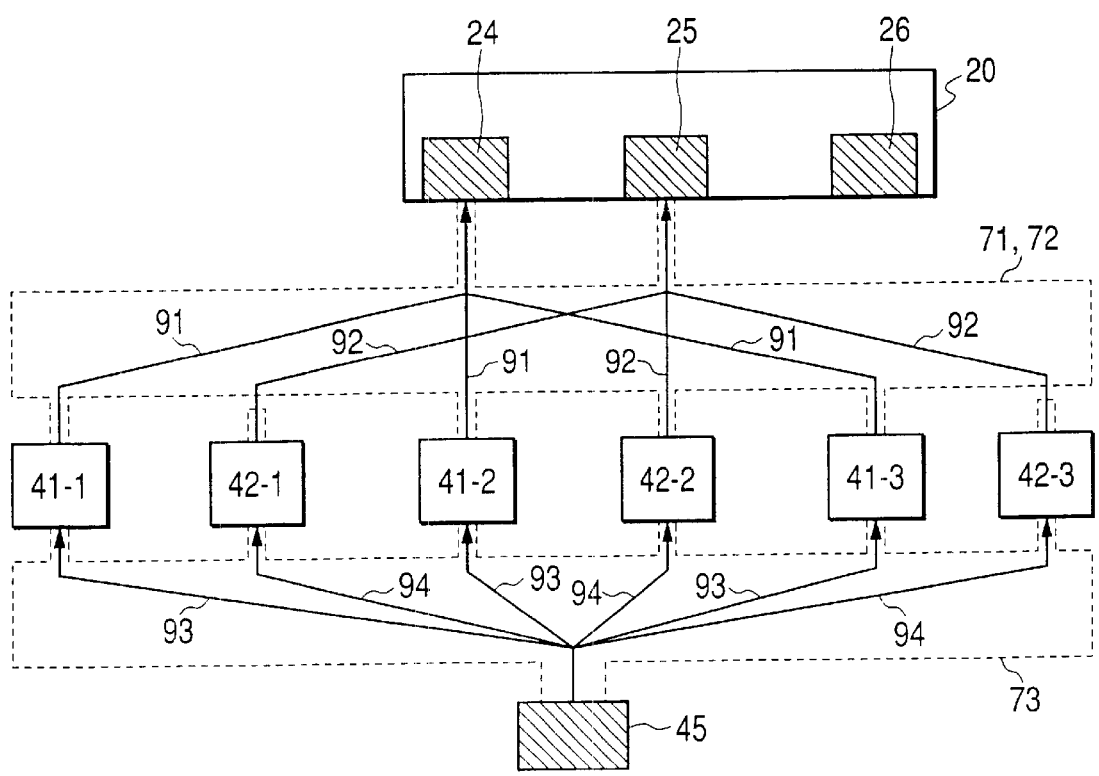
FIG. 8 is a plan view showing a model of current flows in the rectifying circuit 40.

FIG. 8 is a plan view showing a model of current flows in the rectifying circuit 40.

In FIG. 8, main current flow paths of a current flowing between the cathodes "C" of the first rectifying elements 41-1, 41-2 and 41-3 and the first terminal 24 of the transformer 20 are designated by reference numeral 91. Main current flowpaths of current flowing between the cathodes "C" of the second rectifying elements 42-1, 42-2 and 42-3 and the second terminal 25 of the transformer 20 are designated by reference numeral 92. Main current flow paths of current flowing between the anodes "A" of the first rectifying elements 41-1, 41-2 and 41-3 and the grand terminal 45 are designated by reference numeral 93. Main current flow paths of a current flowing between the anodes "A" of the second rectifying elements 42-1, 42-2 and 42-3 and the grand terminal 45 are designated by reference numeral 94.

As seen from FIG. 8, in the rectifying circuit 40 of the embodiment, the current flow paths 91 and the current flow paths 93 are closely disposed, and the current flow paths 93 and the current flow paths 94 are closely disposed. For this reason, a loss by the high-frequency current flowing through the current flow path 91 is effectively cancelled by the high-frequency current flowing through the current flow path 92. A loss by the high-frequency current flowing through the current flow path 92 is effectively cancelled with the high-frequency current flowing through the current flow path 91. The same thing is true for the high-frequency currents flowing through the current flow path 93 and the current flow path 94. For this reason, in the rectifying circuit 40 of the embodiment, AC resistance Rac of the wiring patterns 71 to 73 is effectively reduced.

Figure 9:
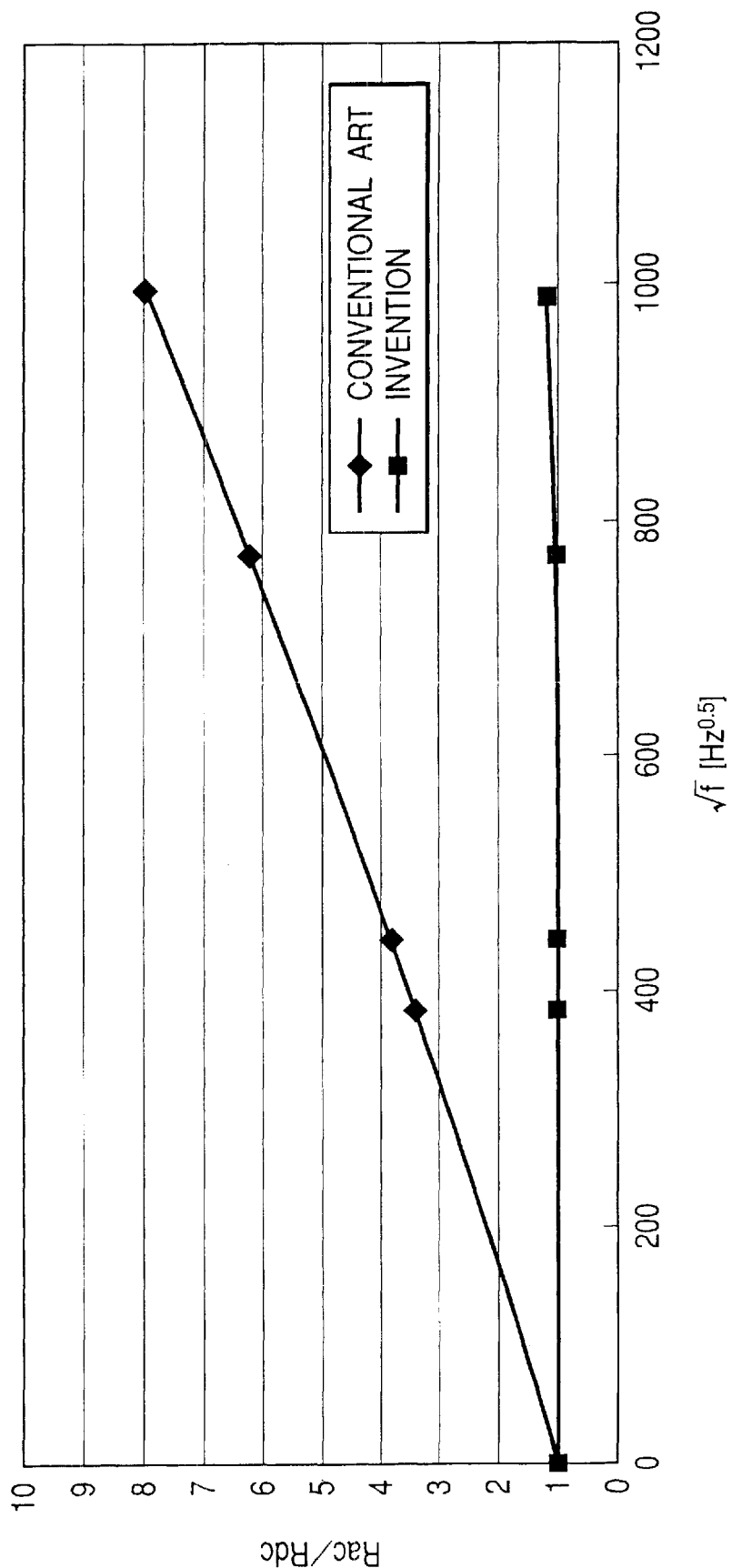
FIG. 9 is a graph showing a relationship between a frequency of an AC current flowing through the rectifying circuit 40 and a ratio of AC resistance Rac to DC resistance Rdc in the wiring patterns 71 to 73.
Figure 11:
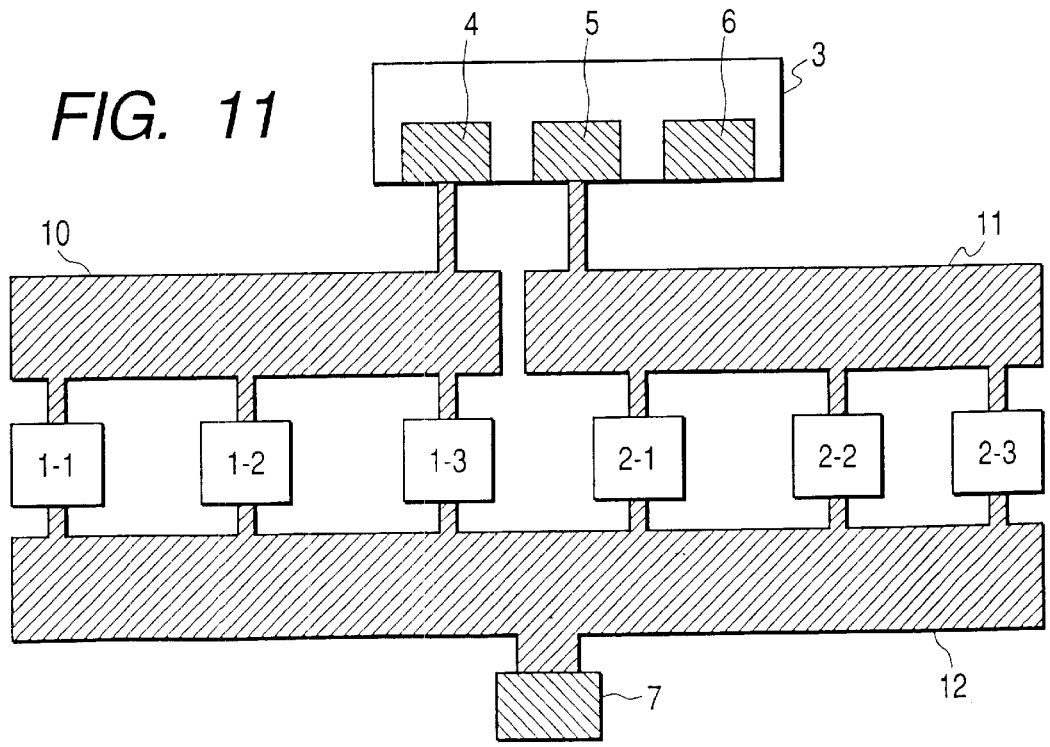
FIG. 11 is a plan view schematically showing a circuit layout of a conventional rectifying circuit.

FIG. 9 is a graph showing a relationship between a frequency of an AC current flowing through the rectifying circuit 40 and a ratio of AC resistance Rac to DC resistance Rdc in the wiring patterns 71 to 73. In FIG. 9, the ordinate represents a ratio of AC resistance Rac to DC resistance Rdc, and the abscissa represents the square root of the frequency (the frequency to the 0.5) of the AC current. FIG. 9 also shows a relation of the same in a conventional rectifying circuit in FIG. 11 as a comparative example.

As seen from FIG. 9, in the rectifying circuit 40 of the embodiment, the Rac/Rdc ratio little varies with respect to the frequency. This implies that even if the frequency becomes high, rise of the AC resistance Rac is small. On the other hand, in the conventional rectifying circuit, the ratio of the AC resistance Rac to the DC resistance Rdc is substantially proportional to the square root of the frequency of the AC current, as seen also from the graph. This implies that the AC resistance Rac increases with increase of the frequency.

As seen described above, in the embodiment, the first rectifying elements 41-1, 41-2 and 41-3 and the second rectifying elements 42-1, 42-2 and 42-3, which constitute the rectifying circuit 40, are alternately arranged. With this arrangement, the current flow paths 91 and the current flow paths 92 are closely disposed, and the current flow path 93 and the current flow path 94 are closely disposed. Therefore, AC resistance Rac of the wiring patterns 71 to 73 is remarkably reduced. With this unique feature, the rectifying circuit 40 of the embodiment is especially well adaptable for the switching power supply device which handles a large current. Further, in the embodiment, even when the frequency of the current flowing through the rectifying circuit 40 becomes high, the AC resistance Rac is little changed. Therefore, the rectifying circuit 40 of the embodiment is especially well adaptable also for the switching power supply device whose switching frequency is high.

Another preferred embodiment of the invention will be described.

Figure 10:
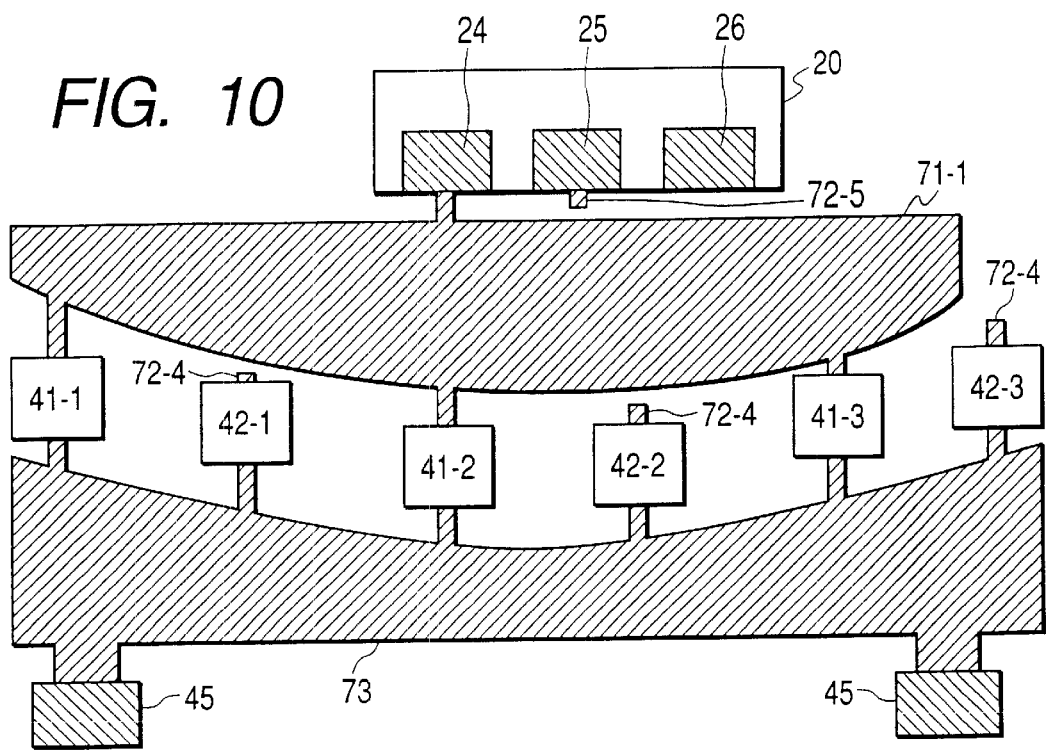
FIG. 10 is a plan view schematically showing a circuit layout of a rectifying circuit 40', which is another preferred embodiment of the invention.

FIG. 10 is a plan view schematically showing a circuit layout of a rectifying circuit 40', which is another preferred embodiment of the invention.

As shown in FIG. 10, the rectifying circuit 40' of the embodiment includes three first rectifying elements 41-1, 41-2 and 41-3 which constitute a first rectifying element group 41, and three second rectifying elements 42-1, 42-2 and 42-3 which constitute a second rectifying element group 42, as in the rectifying circuit 40 of the embodiment mentioned above. However, in the rectifying circuit 40', unlike the embodiment as mentioned above, those rectifying elements are arcuately arranged.

With such an arrangement of the rectifying elements, the current flow paths 91 to 94 are reduced in distance when viewed in a straight line. This results in reduction of the DC resistance Rdc per se in the wiring patterns 71 to 73. If the DC resistance in the wiring patterns 71 to 73 is reduced, the AC resistance Rac in the wiring patterns 71 to 73 is also reduced. Therefore, the AC resistance Rac of the instant embodiment is further reduced when comparing to that of the rectifying circuit 40 of the embodiment as mentioned above.

It should be understood that the invention is not limited to the above-mentioned embodiments, but may variously be modified, altered and changed within the scope and true spirits of the invention.

For example, in the above embodiments, each of the rectifying circuits 40 and 41' includes the first and the second rectifying element groups 41 and 42 each consisting of three rectifying elements. However, in a case where each of the first rectifying element group 41 and the second rectifying element group 42 consists of other than three rectifying elements, what one has to do is that arranging the rectifying elements constituting the first rectifying element group 41 and the rectifying elements constituting the second rectifying element group 42 alternately.

Further, in each of the above-mentioned embodiments, the rectifying elements constituting the first rectifying element group 41 and the rectifying elements constituting the second rectifying element group 42 are alternately arranged. However, it is not essential to arrange perfectly alternately those rectifying elements. Of the boundaries each between two adjacent rectifying elements, the boundary between of the two rectifying elements, which belong to the same rectifying element group is defined as a first boundary, and the boundary between the two rectifying elements, which belong to different rectifying element groups, is defined as a second boundary. In this case, if two or more number of second boundaries are present, any circuit layout may be taken. However, the effects of the invention are more remarkable as a ratio of the number of the second boundaries to the number of all the boundaries becomes larger. The effects of the invention are most remarkable when all the boundaries of the rectifying elements are the second boundaries. For this reason, it is preferable that in the invention, the rectifying elements are laid out so that the second boundaries are 50% or more of all the boundaries.

Further, the rectifying elements of the first and the second rectifying element groups are not limited to diodes, but FETs or bipolar transistors may be used for the rectifying elements instead.

As seen from foregoing description, the present invention succeeds in providing a rectifying circuit having wiring patterns configured to have reduced resistance Rac, and a switching power supply device including such a rectifying circuit.

What is claimed is:

1. A rectifying circuit comprising:
   a pair of input terminals at which an AC voltage appears;
   a plurality of first rectifying elements;
   a plurality of second rectifying elements;
   a first wiring pattern for connecting one of said paired input terminals to said plurality of first rectifying elements; and
   a second wiring pattern for connecting the other of said paired input terminals to said plurality of second rectifying elements,
   wherein said plurality of first rectifying elements and said plurality of second rectifying elements are laid out so that at least two boundaries between said first and second rectifying elements adjacent to each other are present.

2. A rectifying circuit according to claim 1, wherein the number of boundaries between said first and second rectifying elements adjacent to each other, is larger than the sum of the number of boundaries between said two first rectifying elements adjacent to each other, and the number of boundaries between said two second rectifying elements adjacent to each other.

3. A rectifying circuit according to claim 2, wherein said plurality of first rectifying elements and said plurality of second rectifying elements are alternately arranged.

4. A rectifying circuit according to any one of claims 1 to 3, wherein said plurality of first rectifying elements and said plurality of second rectifying elements are substantially linearly arranged.

5. A rectifying circuit according to any one of claims 1 to 3, wherein said plurality of first rectifying elements and said plurality of second rectifying elements are arcuately arranged.

6. A rectifying circuit comprising:
   a pair of input terminals at which an AC voltage appears;
   a plurality of first rectifying elements;
   a plurality of second rectifying elements;
   a first wiring pattern for connecting one of said paired input terminals to said plurality of first rectifying elements;
   a second wiring pattern for connecting the other of said paired input terminals to said plurality of second rectifying elements;
   a pair of output terminals at which a voltage produced by rectifying said AC voltage; and
   a third wiring pattern for connecting one of said output terminals to said plurality of first rectifying elements and said plurality of second rectifying elements,
   wherein said plurality of first rectifying elements and said plurality of second rectifying elements are laid out so that at least two boundaries between said first and second rectifying elements adjacent to each other are present.

7. A rectifying circuit according to claim 6, wherein the number of boundaries between said first and second rectifying elements adjacent to each other, is larger than the sum of the number of boundaries between said two first rectifying elements adjacent to each other, and the number of boundaries between said two second rectifying elements adjacent to each other.

8. A rectifying circuit according to claim 6, wherein said plurality of first rectifying elements and said plurality of second rectifying elements are alternately arranged.

9. A rectifying circuit according to any one of claims 6 to 8, wherein said plurality of first rectifying elements and said plurality of second rectifying elements are substantially linearly arranged.

10. A rectifying circuit according to any one of claims 6 to 8, wherein said plurality of first rectifying elements and said plurality of second rectifying elements are arcuately arranged.

11. A rectifying circuit comprising:
    a pair of input terminals at which an AC voltage appears;
    a plurality of first rectifying elements;
    a plurality of second rectifying elements;
    a first wiring pattern for connecting one of said paired input terminals to said plurality of first rectifying elements; and
    a second wiring pattern for connecting the other of said paired input terminals to said plurality of second rectifying elements,
    wherein said plurality of first rectifying elements and said plurality of second rectifying elements are laid out so that at least two boundaries between said first and second rectifying elements adjacent to each other are present, and wherein said first wiring pattern is formed with of a plurality of first unit wiring patterns formed on a multi-layered circuit board, and said second wiring pattern is formed with a plurality of second unit wiring patterns formed on said multi-layered circuit board.

12. A rectifying circuit according to claim 11, wherein the number of boundaries between said first and second rectifying elements adjacent to each other, is larger than the sum of the number of boundaries between said two first rectifying elements adjacent to each other, and the number of boundaries between said two second rectifying elements adjacent to each other.

13. A rectifying circuit according to claim 12, wherein said plurality of first rectifying elements and said plurality of second rectifying elements are alternately arranged.

14. A rectifying circuit according to any one of claims 11 to 13, wherein said plurality of first rectifying elements and said plurality of second rectifying elements are substantially linearly arranged.

15. A rectifying circuit according to any one of claims 11 to 13, wherein said plurality of first rectifying elements and said plurality of second rectifying elements are arcuately arranged.

16. A rectifying circuit according to claim 11, wherein said plurality of first unit wiring patterns and said plurality of second unit wiring patterns are alternately formed in said multi-layered circuit board.

17. A switching power supply device comprising:
a switching circuit for converting DC input voltage into AC voltage;
a rectifying circuit for rectifying said AC voltage, said rectifying circuit including a pair of input terminals to which said AC voltage is applied, a plurality of first rectifying elements, a plurality of second rectifying elements, a first wiring pattern for connecting one of said paired input terminals to said plurality of first rectifying elements, and a second wiring pattern for connecting the other of said paired input terminals to said plurality of second rectifying elements; and
a smoothing circuit for smoothing output voltage from said rectifying circuit,
wherein said plurality of first rectifying elements and said plurality of second rectifying elements are laid out so that at least two boundaries between said first and second rectifying elements adjacent to each other are present.

18. A switching power supply device according to claim 17, wherein the number of boundaries between said first and second rectifying elements adjacent to each other, is larger than the sum of the number of boundaries between said two first rectifying elements adjacent to each other, and the number of boundaries between said two second rectifying elements adjacent to each other.

19. A switching power supply device according to claim 18, wherein said plurality of first rectifying elements and said plurality of second rectifying elements are alternately arranged.

20. A switching power supply device comprising:
a switching circuit for converting DC input voltage into AC voltage;
a rectifying circuit for rectifying said AC voltage, said rectifying circuit including a pair of input terminals to which said AC voltage is applied, a plurality of first rectifying elements, a plurality of second rectifying elements, a first wiring pattern for connecting one of said paired input terminals to said plurality of first rectifying elements, and a second wiring pattern for connecting the other of said paired input terminals to said plurality of second rectifying elements; and
a smoothing circuit for smoothing output voltage from said rectifying circuit,
wherein said plurality of first rectifying elements and said plurality of second rectifying elements are laid out so that at least two boundaries between said first and second rectifying elements adjacent to each other are present, and
wherein said rectifying element further comprises a pair of output terminals connected to said smoothing circuit, and a third wiring pattern for connecting one of said paired output terminals to said plurality of first rectifying elements and said plurality of second rectifying elements.

21. A switching power supply device according to claim 20, wherein the number of boundaries between said first and second rectifying elements adjacent to each other, is larger than the sum of the number of boundaries between said two first rectifying elements adjacent to each other, and the number of boundaries between said two second rectifying elements adjacent to each other.

22. A switching power supply device according to claim 21, wherein said plurality of first rectifying elements and said plurality of second rectifying elements are alternately arranged.

23. A switching power supply device according any one of claims 20 to 22, further comprising a transformer having a pair of secondary side terminals and a center tap, wherein said paired input terminals of said rectifying circuit are connected to said paired secondary side terminals of said transformer, and the other of said paired output terminals of said rectifying circuit is connected to the center tap of said transformer.

* * * * *